Dec. 3, 1940.  A. BINKOWSKI  2,223,946

FISHHOOK RELEASE TRIGGER

Filed Oct. 2, 1939

Inventor
Andrew Binkowski

By Samuel H. Davis
Attorney

Patented Dec. 3, 1940

2,223,946

UNITED STATES PATENT OFFICE 2,223,946

FISHHOOK RELEASE TRIGGER

Andrew Binkowski, Lansing, Mich.

Application October 2, 1939, Serial No. 297,608

2 Claims. (Cl. 43—36)

This invention relates to fishhook release triggers, and is intended with elastically connected double fishhooks, which hooks are held in a combined position by a trigger or slide until the fish has taken the bait, whereupon the trigger is rocked upon the shanks of the hooks when the fish pulls on the hooks or the fisherman pulls upon the line, and the hooks are resiliently thrown apart and the fish is secured by the hooks.

The object of this invention is the production of a trigger or similar device having a special formation and construction designed to hold the resilient shanks of the hooks together and to release the hooks when the line is pulled. It is believed that the particular construction herein disclosed is an improvement and is more effective and reliable than those slides or devices for the same purpose with which this applicant is acquainted.

In the accompanying drawing the various parts and the individual arrangement thereof are illustrated, and Fig. 1 of the drawing represents two resiliently coupled fishhooks when those hooks are held together by the trigger. The connection of the line is also set forth in this Fig. 1.

Throughout the draining and description the same number is used to refer to same part.

Hooks 1 and 2, which may be without or with barbs, are usually formed from a single piece of resilient wire having the eye junction 3 through which is passed the line 4.

Figure 4:
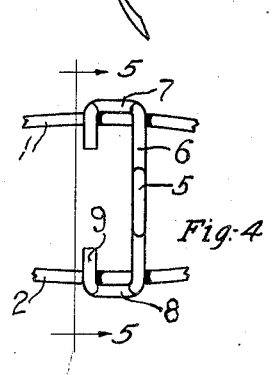
Fig. 4 is a top or plan view of the trigger from above.
Figure 5:
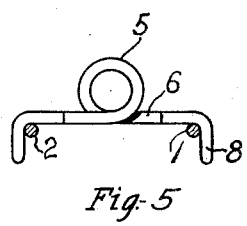
Fig. 5 is a front view of the trigger showing the shanks of the hooks in section. The view in Fig. 5 represents a section taken on the line 5—5 of Fig. 4.

The trigger constituting this invention is best shown in Figs. 4 and 5. The line is tied to the eye 5. The trigger has the body portion 6 extending on the side of the eye and the terminations of the body are the U-shaped loops 7 and 8, each of which has an upwardly continuance 9 the end of which is bent inwardly towards the middle of the trigger as best shown in Fig. 4. There is no hook end which may catch upon the shanks of the hooks. The positions of the shanks of the hooks are shown in section in Fig. 5.

Figure 1:
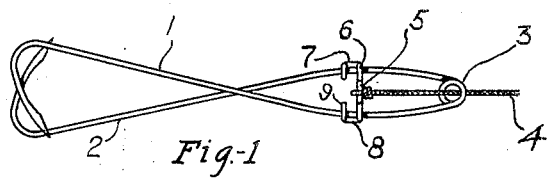
Figure 2:
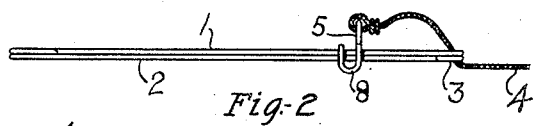
Fig. 2 is a side view of the parts illustrated in Fig. 1.
Figure 3:
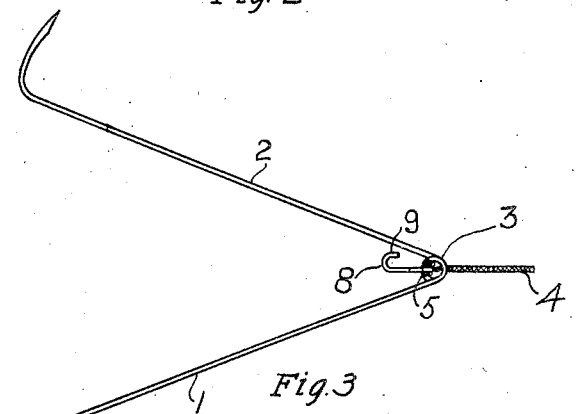
Fig. 3 shows the hooks spread apart, the trigger having been pulled towards the eye joint of the hooks.

In the operation of this invention, considering Fig. 2, a pull on the line creates a rocking movement of the trigger on the shanks of the hooks, and this is the releasing movement for the shanks of the hooks. It will be noted that there is no bent end so disposed as to catch the hook shanks, and the release is prompt and positive every time. The trigger, because tension is applied to the top of the eyelet, has a tendency to rock slightly as well as to slide and pull off the hook shanks. When the trigger is released or freed from the shanks, it may assume any position, for example as illustrated in Fig. 3. Upon again arranging the hooks together as drawn in Fig. 1, the trigger is caused to engage the hook shanks as set out in Figs. 1, 2 and 4.

Having now described this invention, I claim:

1. A fishhook release trigger, comprising a middle eye and a body portion extending on both sides of the eye, and the ends of said body having downwardly and upwardly bent portions, said bent portions forming downwardly extending U-shaped loops at the ends of the said body portion.

2. A fishhook release trigger, in combination with a pair of fishhooks with resilient shanks having an eye junction through which the line is passed, a trigger adapted to engage the hook shanks whereby the hooks are held together in releasable relation, the said trigger being attached to the line and constructed with portions adapted to engage the hook shanks and to slide thereon and become freed from the shanks when the line is pulled upon.

ANDREW BINKOWSKI.